(12) United States Patent
Sousa

(10) Patent No.: US 10,308,551 B2
(45) Date of Patent: Jun. 4, 2019

(54) RUBBER COMPOSITE AND PROCESS FOR OBTAINING SAME

(71) Applicant: Jorge B. Sousa, Walnut Creek, CA (US)

(72) Inventor: Jorge B. Sousa, Walnut Creek, CA (US)

(*) Notice: Subject to any disclaimer, the term of this patent is extended or adjusted under 35 U.S.C. 154(b) by 0 days.

(21) Appl. No.: 15/489,893

(22) Filed: Apr. 18, 2017

(65) Prior Publication Data

US 2018/0297898 A1    Oct. 18, 2018

(51) Int. Cl.
| | |
|---|---|
| *C04B 26/00* | (2006.01) |
| *C08L 7/00* | (2006.01) |
| *C04B 2/02* | (2006.01) |
| *C04B 12/00* | (2006.01) |
| *C04B 26/04* | (2006.01) |
| *C08L 95/00* | (2006.01) |
| *C04B 111/00* | (2006.01) |

(52) U.S. Cl.
CPC .............. *C04B 26/003* (2013.01); *C04B 2/02* (2013.01); *C04B 12/00* (2013.01); *C04B 26/04* (2013.01); *C08L 7/00* (2013.01); *C08L 95/00* (2013.01); *C04B 2111/0075* (2013.01); *C08L 2205/025* (2013.01); *C08L 2205/22* (2013.01); *C08L 2207/24* (2013.01); *C08L 2555/60* (2013.01)

(58) Field of Classification Search
CPC ......... C04B 26/003; C04B 2/02; C04B 12/00; C04B 2111/0075; C08L 95/00; C08L 7/00; C08L 2205/025; C08L 2205/22; C08L 2207/24; C08L 2555/60
See application file for complete search history.

(56) References Cited

U.S. PATENT DOCUMENTS

| | | | |
|---|---|---|---|
| 4,021,393 A | 5/1977 | McDonald | |
| 4,069,182 A | 1/1978 | McDonald | |
| 4,118,137 A | 10/1978 | LaGrone et al. | |
| 4,166,049 A | 8/1979 | Huff | |
| 4,180,730 A | 12/1979 | Givens et al. | |
| 6,346,561 B1 | 2/2002 | Osborn | |
| 8,182,726 B2 | 5/2012 | Bailey | |
| 2004/0242711 A1* | 12/2004 | Fulford | C08J 11/20 521/41 |
| 2010/0056669 A1 | 3/2010 | Bailey | |
| 2011/0233105 A1 | 9/2011 | Bailey | |
| 2012/0059084 A1* | 3/2012 | Brown | B29B 17/0026 523/300 |
| 2013/0116364 A1 | 5/2013 | Butz et al. | |
| 2014/0377563 A1* | 12/2014 | Sousa | C08K 3/36 428/403 |
| 2015/0080505 A1 | 3/2015 | Blyth et al. | |

FOREIGN PATENT DOCUMENTS

| | | |
|---|---|---|
| WO | 2012/131605 A1 | 10/2012 |
| WO | 2013/132488 A1 | 9/2013 |

* cited by examiner

*Primary Examiner* — Robert S Jones
(74) *Attorney, Agent, or Firm* — Vorys, Sater, Seymour and Pease LLP

(57) ABSTRACT

This disclosure provides a rubber composite for use in a variety of applications, and methods for its preparation.

8 Claims, 6 Drawing Sheets

RUBBER COMPOSITE AND PROCESS FOR OBTAINING SAME

TECHNOLOGICAL FIELD

This invention relates to a rubber composite for use in a variety of applications, and methods for its preparation.

BACKGROUND ART

References considered to be relevant as background to the presently disclosed subject matter are listed below:
[1] U.S. Pat. No. 4,118,137
[2] U.S. Pat. No. 4,166,049
[3] U.S. Pat. No. 4,180,730
[4] U.S. Pat. No. 4,021,393
[5] U.S. Pat. No. 4,069,182
[6] U.S. Pat. No. 6,346,561
[7] PCT Patent Publication No. WO 2012/131605
[8] US Patent Application No. 2010/0056669
[9] US Patent Application No. 2011/0233105
[10] U.S. Pat. No. 8,182,726
[11] PCT Patent Publication No. WO 2013/132488
[12] US Patent Application No. 2013/0116364
[13] US Patent No. 2015/0080505

Acknowledgement of the above references herein is not to be inferred as meaning that these are in any way relevant to the patentability of the presently disclosed subject matter.

BACKGROUND

Bitumen is the heaviest fraction of the oil distillation process. Due to the different original raw materials (oils, tars, bituminous sands and so on) and different technologies of their distillation, bitumen may be used in a variety of applications. One of the main applications for bitumen is as a binder in asphalt mixtures where the bitumen is mixed with mineral aggregates of different sizes, shapes and chemical nature. These asphalt mixtures are particularly used for construction or maintenance of pavements, roads, different service roads and any other rolling surfaces.

Asphalt mixtures are used in applications exposed to a wide variation of environmental conditions. In this connection, the properties of the asphalt bitumen-based binders in high and low temperature conditions are of a decisive importance. At low temperatures, bituminous materials can become brittle, leading to fissures and cracks due to thermal stresses formed. At higher temperatures the viscosity of the bitumen binders becomes lower, potentially leading to rutting of roads. Resistance to fatigue and impact, and the adherence of bitumen binder to aggregate in asphalt mixtures, are also of particular importance for road construction.

The use of bitumen-based binders modified with polymers dates back to the 1970s, when those were formulated to improve the mechanical capabilities of the bituminous binder to withstand increasingly severe stresses caused by traffic. Usually, such modifications mainly seek to improve the elasticity and temperature sensitivity of the bituminous binder, leading to an increased resistance to fatigue, reduced permanent deformation and reduction in the propagation of cracks in the asphalt, either in road application or roofing applications.

The main polymer used, styrene-butadiene-styrene block-copolymer (SBS), helps to increase the softening point of the bituminous binder, thereby increasing flexibility and ductility at low temperatures, and allowing its use in a wider temperature range than conventional, non-modified, bitumen-based binders.

The use of rubber modified bitumen binders in hot asphalt began in the 1940s. In the United States, Charles H. MacDonald and other [1-5] have developed a highly elastic material to be used in the maintenance of pavements and roofing industry. This product was composed of bituminous binder and 18 to 24% ground tire rubber (having a particle size of 0.6 to 1.2 mm), mixed at around 180° C.-190° C. for about 45 minutes. The incorporation of granulated recycled tire rubber into bitumen aimed to improve the mechanical behavior of bituminous mixtures. Recently a few other advantages of this composition have been recognized, such as decreased environmental pollution, reduction of $CO_2$ emissions, better friction in roads, etc. The modification allowed the bitumen to have greater flexibility and hold stable for much longer periods of time compared to conventional bitumen, resulting in a lower rate of aging. However the wet process described in these publications the use of very expensive on-site equipment, which far from being cost-effective.

U.S. Pat. No. 6,346,561 and WO 2012/131605 [6-7] describes a method of combining crumb rubber with gilsonite or tall oil, both of which are light fraction distillates of oil, in the presence of fatty acids, with curative elastomers to form a liquid concentrate to be added to asphalt compositions. However, according to these publications dry processing led to several failures due to the crumb rubber swelling and absorbing the bitumen binder used in the paving composition, causing lack of homogeneity and thus difficulties and poor compaction resulting in cracking in the roads.

In WO 2013/132488 [10] a dry surface granulate in which the rubber particles have been reacted and activated was described, that contained at least 15% wt of heavy-fraction oil distillate and various additives. The additive was used to activate the rubber composite, thereby forming a "reacted and activated rubber", (referred to also as "RAR" for the sake of abbreviation). However, still this process requires relatively large amounts of heavy-oil distillates, which can require the use of complex and expensive equipment.

Thus, there is a need for a rubber composite that will be easier and cheaper to manufacture, while still providing improved mechanical properties and composition stability.

GENERAL DESCRIPTION

The present invention relates to a rubber composite comprising rubber, oil and a combination of powdered additives, as well as a process for manufacturing same.

The rubber may be a natural rubber (i.e. caoutchouc) or a synthetic rubber. The rubber has an internal structure, being characterized by open cellular structure containing pores that are connected to one another and form an interconnected network; and an external surface, being the outmost surface of the rubber particles.

The term oil refers herein to oily carbonaceous products, usually obtained by distillation, refining or fractionation processes of crude oil from different origins such as oil wells, oil sands, fossil fuel, etc. Such fractions typically comprise hydrocarbons and other organic compounds containing nitrogen, sulfur and/or oxygen atoms, and are operatively soluble in various organic solvents, including straight chain hydrocarbon solvents, such as pentane or hexane, at a temperature lower than 40° C. Such heavy-fractions may be, for example, bitumen and asphaltenes. As used herein, oil is also meant to encompass synthetic oils, vegetable oils, mineral oils and any mixtures thereof.

In one of its aspects, the invention provides a rubber composite in particulate form, the composite comprising rubber, at least one first powdered additive, at least one second powdered additive, and at most 15 wt % of at least one oil said rubber having an internal structure and an external surface, wherein said oil is substantially contained within the internal structure of the rubber composite, and wherein the rubber's external surface is substantially oil-dry.

The term composite is used to denote a composition of matter of the invention, composing at least 4 components (i.e. rubber, oil and at least two additives). Therefore, the invention provides a rubber-based composite, in which the oil is substantially contained within the internal structure of the rubber. Namely at least 99.5% of the oil is contained within the rubber, while the rubber's external surface is substantially oil-dry. In some embodiments, 99.6, 99.7, 99.8, 99.9% of the oil is contained within the rubber. In other embodiments, the oil is completely contained within the internal structure of the rubber, namely no oil exits on the external surface of the rubber.

The term oil-dry thus stands to mean that the external surface, namely the out-most layer of the rubber composite, is substantially, or completely, free of oil. It should be noted that while the oil is substantially contained within the internal structure, the pores of said structure need not be fully packed.

In some embodiments, the oil is selected from the group consisting of bitumen, synthetic oil, mineral oil, vegetable oil and mixtures thereof. In some other embodiments, the oil is bitumen.

In other embodiments, the rubber is in the form of particles (particulate). The rubber composite of the invention may be of any shape selected from a particle, a flake, a sheet, a crumb, a grain, a pellet, a granule, etc. In some embodiments, the composite is in a form of particles. In other embodiments, the composition is in a form of pellets. The term particle size typically refers to the average diameter of the particles. When the particles are of non-spheroid shape, the term refers to the average equivalent diameter of the particle, namely the diameter of an equivalent spherical particle based on the longest dimension of the particle. In some embodiments, the particle size of the rubber composite is between about 1 and about 800 μm (micrometers).

In some embodiments, the rubber is vulcanized, i.e. cross-linked, or sulfur-cured rubber. In some embodiments, the rubber is a particulate vulcanized rubber.

As noted above, one of the features of the rubber composite of this disclosure is the relatively low oil content, thus permitting the entire content of the oil to reside within the internal structure of the rubber, such that the surface of the particles are not sticky or oily. Further, the low content of oil reduces the production costs of the composite and reduces the duration of the manufacturing process, as a smaller quantity of oil needs to be absorbed by the rubber particles. As it will be further demonstrated below, the low content of oil improves the mechanical properties and the composite stability over time. According to some embodiment, the composite of the invention comprises between about 10 and about 20-wt % of oil. According to other embodiments, the composite may comprise between about 10 and about 15 wt % of oil.

As also noted, the rubber composite comprises at least two powdered additives. A first additive is typically contained within the internal structure of the rubber composite, while a second additive is typically present at the external surface of the composite. Thus, the first additive resides within the pores or the mesh-like structure of the rubber, thereby limiting the amount of oil that the rubber can absorb into its internal structure. The second additive seals the external surface of the composite, preventing it from absorbing bitumen from the paving formulation into which the rubber composite is added, as well as preventing rubber composite particles to adhere to one another, thereby improving the stability of both the rubber comprise and the paving formulation. As also unexpectedly found, the combination of additives also improves disperseability and dispersion homogeneity of the composite in paving formulation, and, as will be demonstrated herein, provides obtaining a rubber composite which is highly improves the elasticity of the paving formulation at lower contents of the rubber composite compared to other formulation known in the art.

The first and second additives are typically mineral-based powders, and may each be independently selected from the group consisting of limestone, hydrated lime, cement, silica, and mica.

In some embodiments, the at least one first additive is present in the rubber composite at a content of between about 15 and about 30 wt %. In other embodiments, the at least one second additive is present in the rubber composite at a content of between about 5 and about 10 wt %.

Another aspect of the invention provides a paving composition comprising a rubber composite as described herein, a paving binder (e.g. bitumen or any other suitable heavy oil distillate) and paving aggregate (e.g. crushed limestone, crushed cement, or any other suitable paving aggregate known in the art).

In some embodiments the pacing compositions comprises up to 40 wt % of the rubber composite, e.g. between 1 and 40 wt %, between 1 and 25 wt %, between 1 and 20 wt %, between 1 and 15 wt % or even between 1 and 10 wt %.

In a further aspect of the invention, there is provided a process for obtaining a rubber composite in particulate form, the process comprising:
  (a) mixing oil with particulate rubber at a first elevated temperature under conditions of high sheer rate to obtain oil-swollen rubber particles;
  (b) adding at least one first powdered additive to the oil-swollen rubber particles to obtain a mixture;
  (c) reducing the temperature of the first mixture by at least 20° C.;
  (d) heating the first mixture to a second elevated temperature under conditions of high sheer rate;
  (e) reducing the temperature of the mixture to about 20° C. at a cooling rate of at least 2° C./min; and
  (f) adding at least one second powdered additive to said mixture under conditions of high sheer rate to said rubber composite, such that the rubber composite comprises between about 10 and about 20% wt of said oil, the oil and said at least one first additive being substantially contained within an internal structure of the rubber, and the rubber's external surface being substantially oil-dry and said at least one second additive is present at the external surface of the rubber composite.

In some embodiments, the rubber composite comprises between about 10 and about 15% wt of said oil.

The process of the invention involves a unique combination of high kinetic energy mixing steps at elevated temperatures with thermal shock stages. This permits obtaining relatively quick absorption of the oil into the rubber at relatively low temperatures (compared to processes known in the art). Without wishing to be bound by theory, the process is designed to first permit absorption of oil (e.g. bitumen) into the rubber particles to form swollen and highly energized rubber. After intensive agitation and high kinetic energy, and upon reaching a preselected temperature (as a function of the type of rubber used, e.g. recycled car or truck tires or combination), the mixture is subjected to a thermal shock in which the pores of the swollen rubber are closed or blocked by contraction (due to the thermal shock) and the addition of the first additive. It is of note that the mixture is not left at elevated temperatures for more than a few minutes (unlike processes known from the art, e.g. wet processes). The conditions applied by the process of this disclosure is specifically designed to degradation of the rubber, as to avoid the point where it becomes a "gel". Both the kinetic energy and the temperature shock are intended to partially brake sulfur links, thus assist in digesting the rubber, thus assisting in absorbance of the oil and the first additives into the internal structure of the rubber and locking them therein.

At the consequent steps, the mixture is heated again, undergoes a more drastic thermal shock, and then the second additive is added to the external surface of the rubber composite. This prevents the rubber particles from further absorbing (in the short term) bitumen during the process of preparing a paving composition in the contractor's plant, and during transportation and compaction in the pavements, and also prevents long term absorption of the lighter fraction of bitumen binder (that could cause disintegration of the paved road).

As noted above, the steps of mixing are conducted under conditions of high sheer rate, meaning the mixing is performed under such conditions that high kinetic energy is introduced into the mixture during mixing. Such high-energy input, in some embodiments of at least 700 KJ/kg, may be carried out by applying a mixing at a rate of at least 1200 rpm, at least 1300 rpm, at least 1400 rpm or even at least 1500 rpm.

In some embodiments, the first elevated temperature may be between about 100° C. and 170° C. In other embodiments, said first elevated temperature may be carried out at a temperature selected from 100° C., 105° C., 110° C., 115° C., 120° C., 125° C., 130° C., 135° C., 140° C., 145° C., 150° C., 155° C., 160° C., 165° C., or 170° C.

In some other embodiments, the mixing at step (a) is carried out for a period of time of between about 5 and 30 minutes.

According to some embodiments, the rubber particles (i.e. prior to applying the process), may have an average particles size of at most 0.65 mm (30 mesh), typically between 0.65 and 0.01 mm (30 mesh to 100 mesh). In some embodiments, the process further comprises a pre-step of grinding the rubber prior to employing the process of this invention to reduce the particles to a desired size. It is appreciated that grinding may be carried out by any means known to a person of skill in the art.

Another pre-step, applied before step (a) of the process, is warming the oil, typically bitumen, to a temperature which may be between about 160 and 190° C.

In some embodiments, the temperature of the mixture at step (c) is reduced by at least 20° C., at times by at least 40° C., to induce a first thermal shock. In such embodiments, the mixture may be cooled at a cooling rate of at least 20° C./min.

In some embodiments, the second elevated temperature may be between about 130 and 180° C., at times between 150 and 180° C. The mixture is typically maintained at said second elevated temperature of a period of time of at least 1 minute, for example between 1 and 15 minutes.

In some embodiments, the temperature drop at step (e) is carried out in two stages: a first stage in which the temperature is allowed to drop at a rate of at least 20° C./min, followed by a second step in which the temperature is allowed to drop at a rate of at least 2° C./min.

As used herein, the term "about" is meant to encompass deviation of ±10% from the specifically mentioned value of a parameter, such as length, diameter, force, etc.

Whenever a numerical range is indicated herein, it is meant to include any cited numeral (fractional or integral) within the indicated range. The term "between" or "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be noted that the range is given as such merely for convenience and brevity and should not be construed as an inflexible limitation on the scope of the invention. Accordingly, the description of a range should be considered to have specifically disclosed all the possible sub-ranges as well as individual numerical values within that range.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the present invention, the rubber composite may be used in asphalt mixtures, thereby providing the following technological and operational advantages, as compared to standard existing asphalt mixtures:

better mechanical stability under low and high usage temperatures;
improved rutting resistance and fatigue resistance;
improved wearing resistance;
improved resistance to water damage;
"self-healing" properties—asphalt mixtures comprising the modified-rubber composite show mechanical recovery, as well as recovery of geometrical form and dimensions after unloading;
Improving elasticity of the paving formulation;
Reducing the amount of oil needed to obtain improved mechanical properties of the rubber composite;
Simplifying and reducing costs of the manufacture process.

Figure 1:
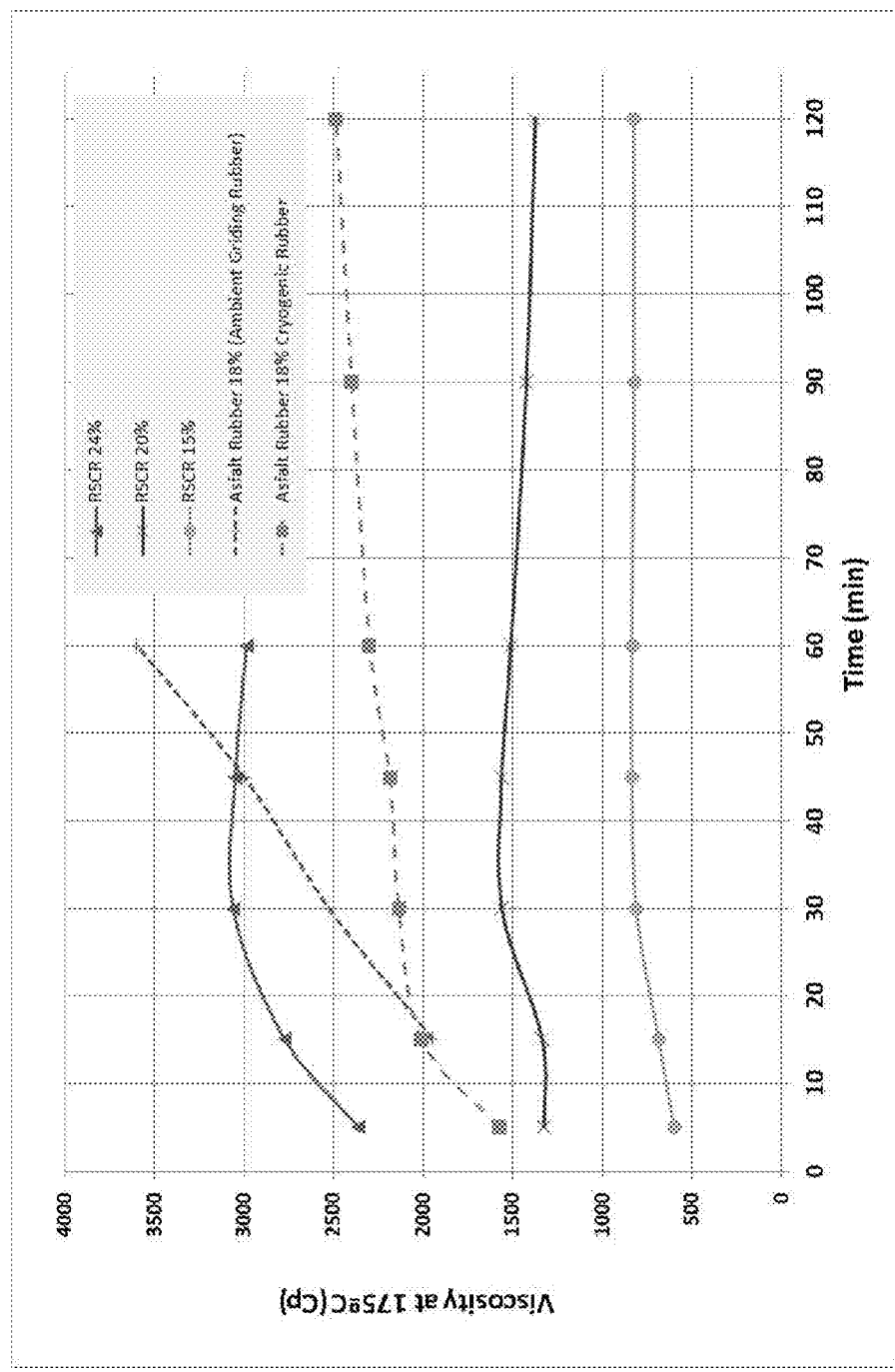
FIG. 1 shows the viscosity change over time of paving compositions comprising various contents of rubber composites of the invention (marked as "RSCR") compared to rubber asphalt.

FIG. 1 demonstrates the change in viscosity of various paving compositions, comprising various amounts of rubber composite (marked as "RSCR") over time, compared to standard asphalt rubber formulations. The tests were carried out according to AASHTO TP48 standard test method. As clearly be seen, no significant change in viscosity was observed over time for the compositions containing RSCR over a wide verity of RSCR contents, while significant increase in viscosity was observed for the standard asphalt-rubber formulations. This attests to the improved stability of the RSCR-based compositions, indicating that the rubber composite does not absorb light fractions of the bitumen binder from the paving composition. In comparison it can be seen that crumb rubber alone (either cryogenic from car tires ASPHALT RUBBER 18% CRYOGENIC or ambient grind from truck tires ASPHALT RUBBER 18%) is not stable as the viscosities increase over time (as the rubber swells and absorbs the lighter fractions over time).

Figure 2:
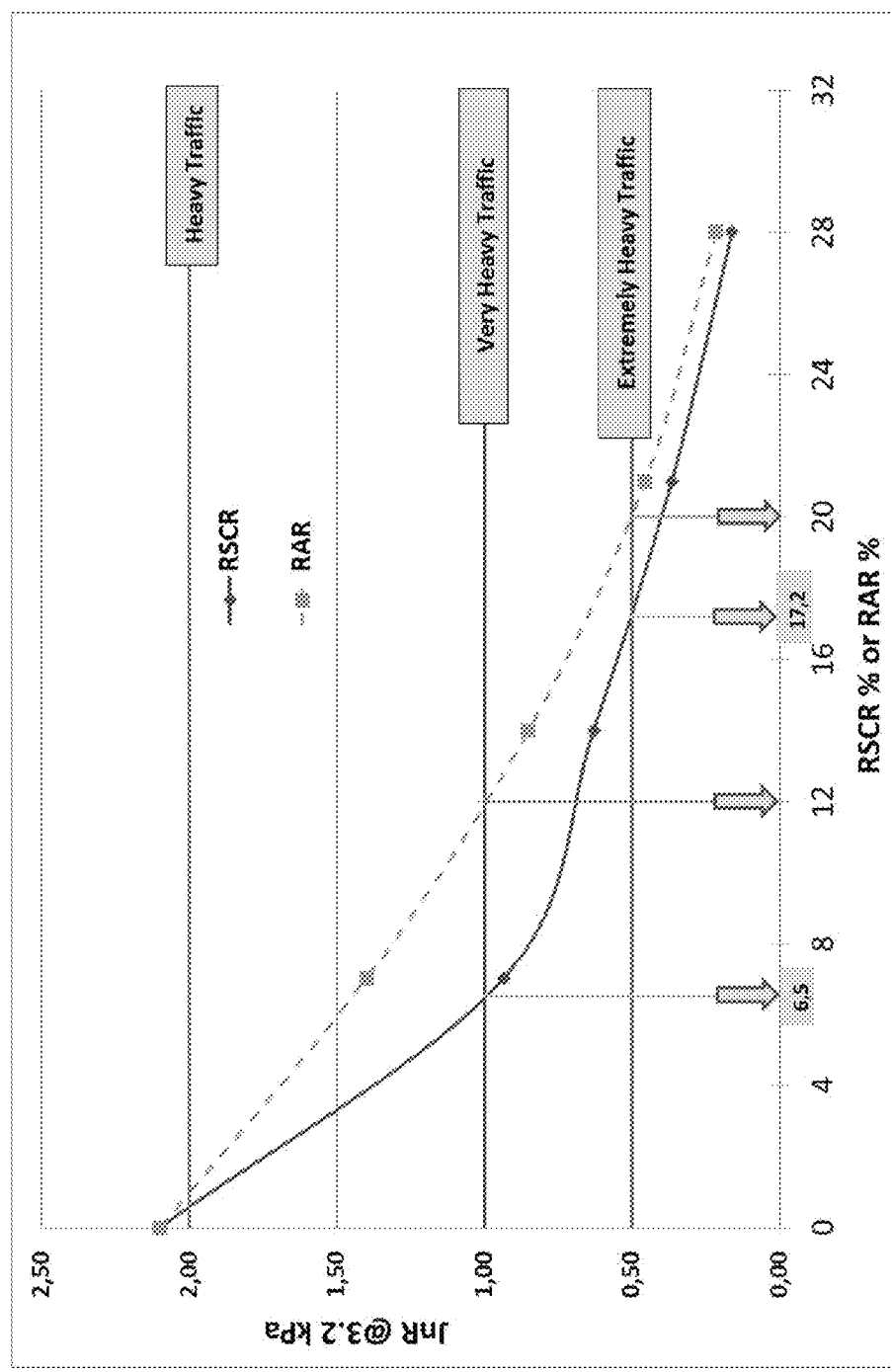
FIG. 2 shows a comparison of JnR at 3.2 kPa between RSCR and reactive-activated rubber (RAR) as function of additives' content.
Figure 3:
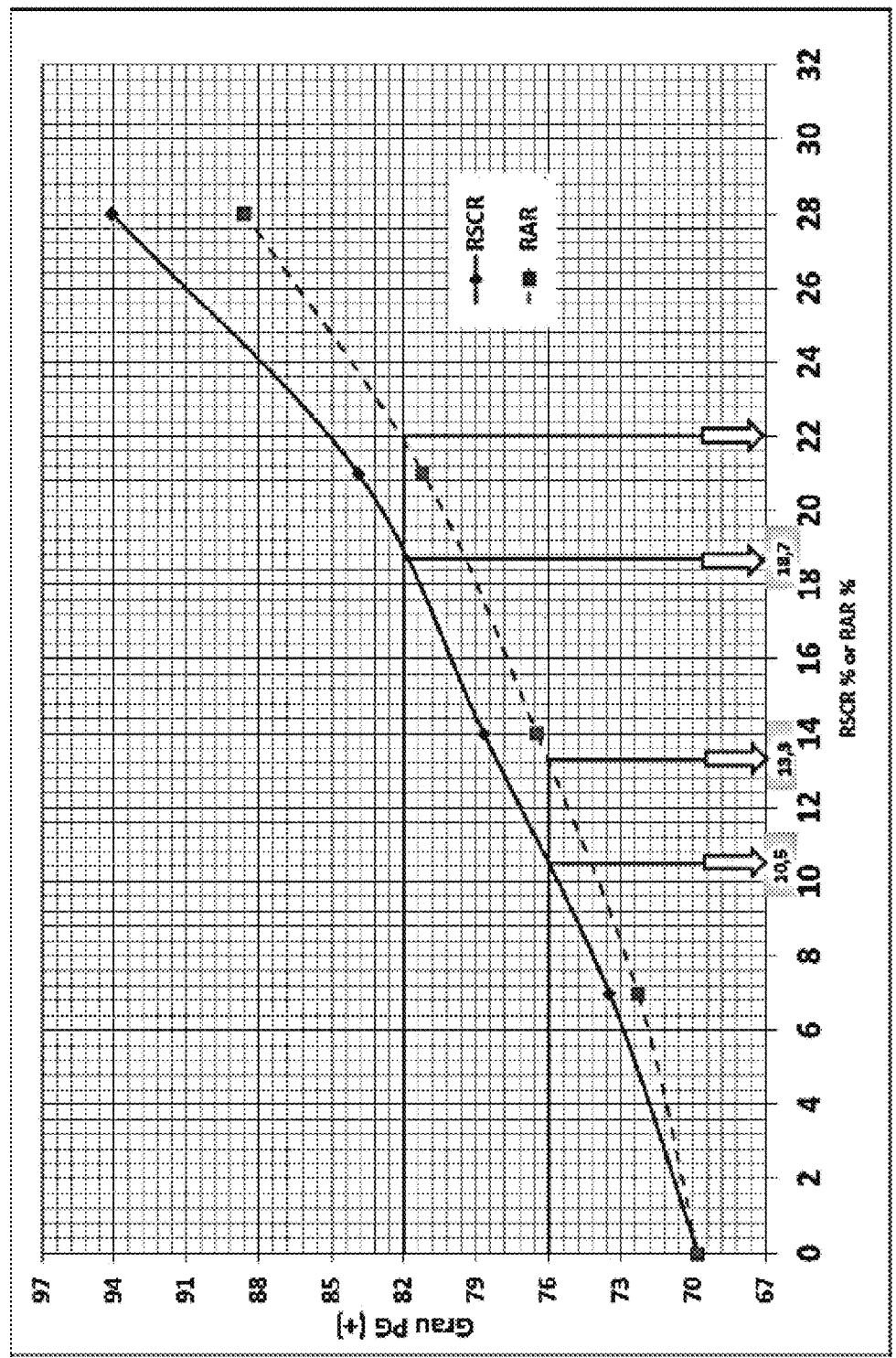
FIG. 3 shows a comparison of positive PG Grade level obtained for RSCR and RAR formulations.

To demonstrate the differences between RSCR and RAR, a series of comparative tests were conducted, using the same base bitumen and same percentages of RSCR and RAR in paving compositions. The PG grade and JnR values (as measured by Multi Stress Creep Recovery (MSCR) AASHTO TP 70, standard RTFO test as per AASHTOT 240 and ASTM D 2872—Effect of Heat and Air on a Moving Film of Asphalt (Rolling Thin-Film Oven Test) and standard DSR test as per AASHTO T 315: Determining the Rheological Properties of Asphalt Binder Using a Dynamic Shear Rheometer) were determined as a function of additives' percentage as it can be observed, as shown in FIGS. 2 and 3.

It can be observed that with only 6.5% of RSCR the 1 kPa for JnR@3.2 kPa (to simulate very heavy traffic) was reached, while the same values were obtained only when adding at least 12% of RAR. To reach the level 0.5 kPa (for Extremely Heavy Traffic) only 17.2% of RSCR was needed instead of 20% RAR.

Similarly to reach the positive grade 76° C., only 10.5% of RSCR was needed instead of 13.3% of RAR. While to reach the 82° C. only 18.7% of RSCR were needed instead of 22% of RAR. These temperatures were used since they are typical PG grade test temperatures.

Therefore, it is clear that significantly less RSCR compared to RAR needs to be added to the pacing composition to reach the same results, attesting to the higher reactivity of RSCR compared to RAR.

Using traditional tests, the advantage of the rubber composite (RSCR) of the invention is further demonstrated.

Figure 4:
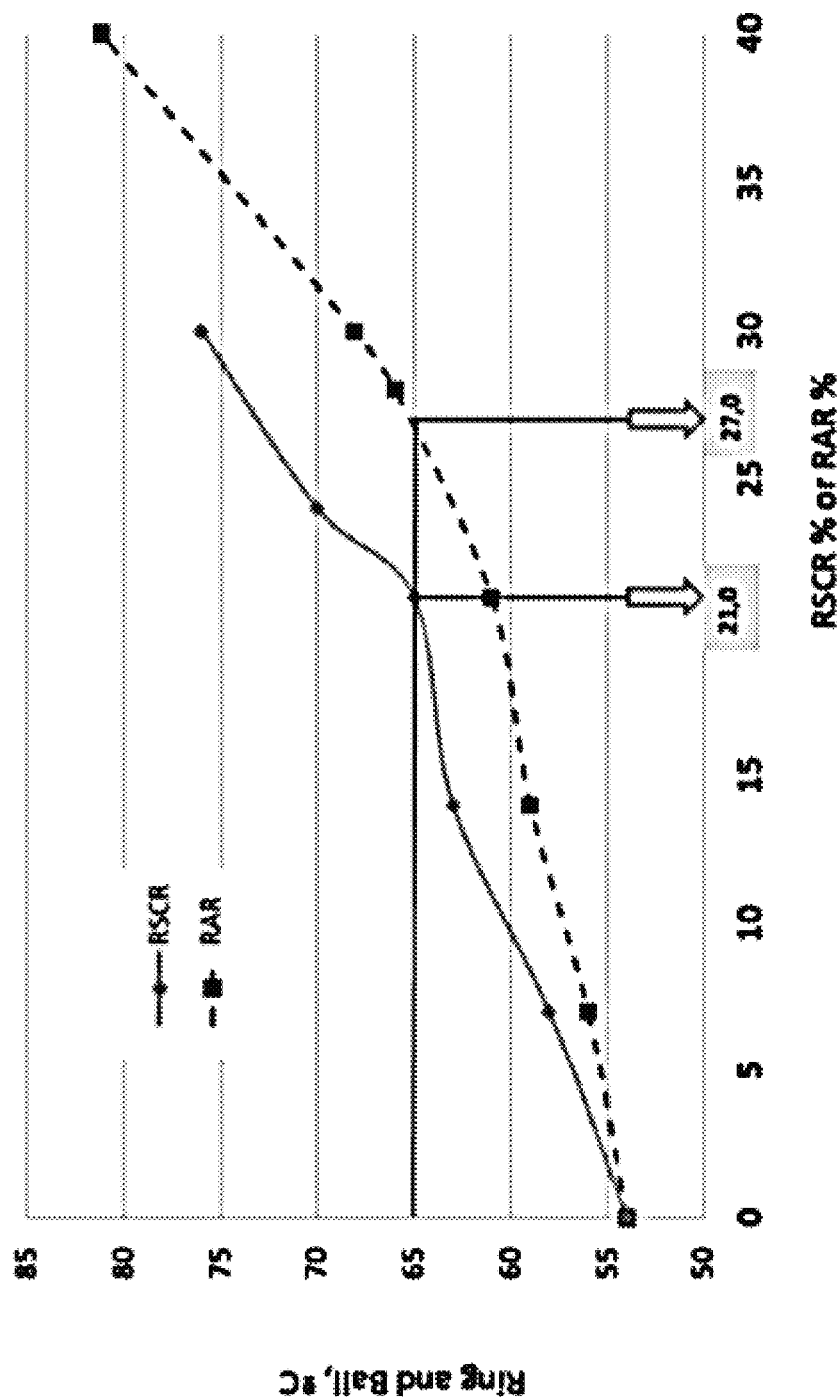
FIG. 4 shows Ring and Ball variation function of RSCR and RAR percentages.

Seen in FIG. 4 are the comparative results of a softening point test, carried out according to ASTM D 36. To reach 65° C. of Softening Point, only 21% of RSCR is needed instead of 27% of RAR.

Figure 5:
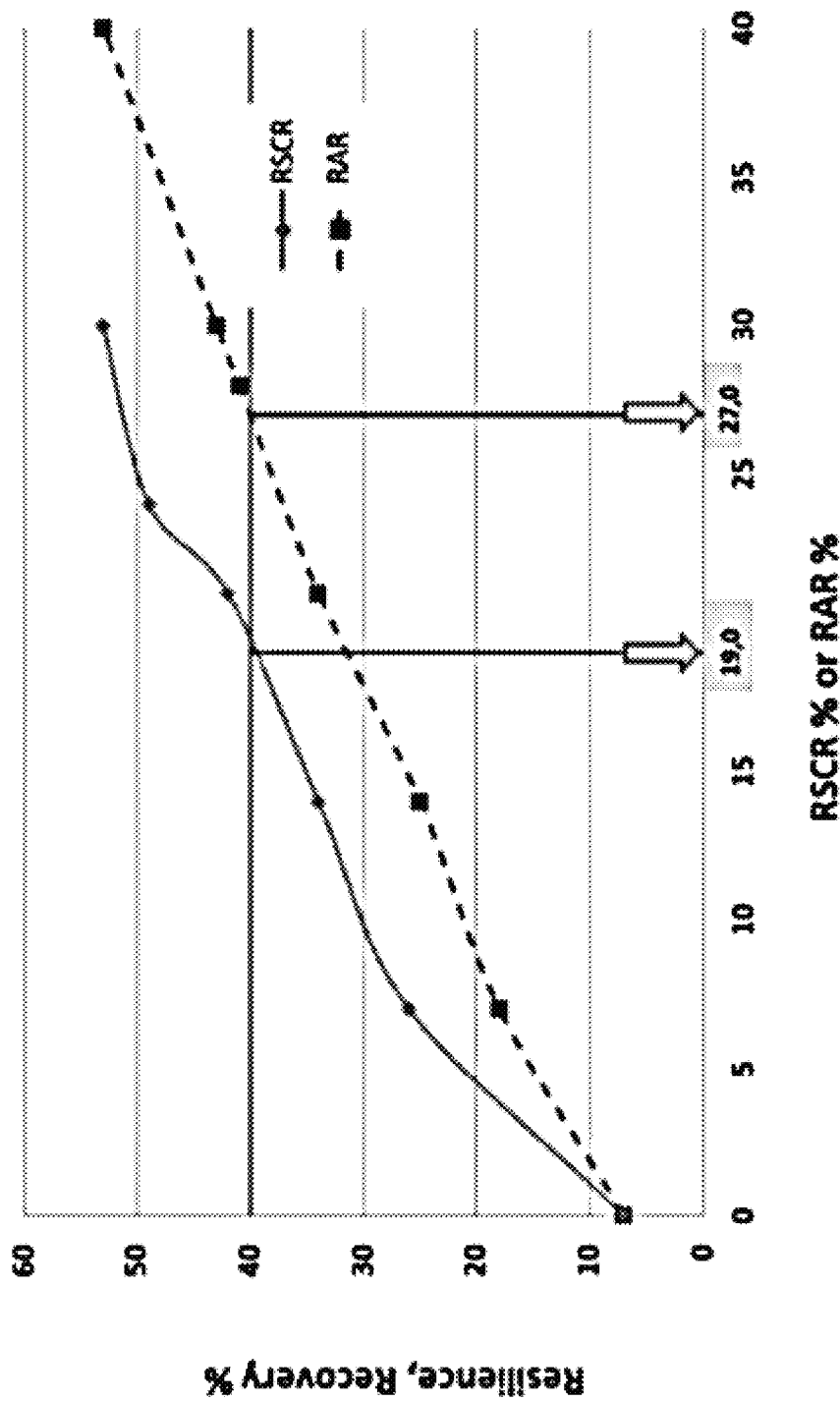
FIG. 5 shows variation of resilience the paving composition as a function of RSCR and RAR percentages.

Resilience was evaluated according to ASTM D 5329-96. As further seen in FIG. 5, to reach a 40% Resilience only 19% of RSCR is needed instead of 27% of RAR. As such, RSCR consistently showed higher activity than RAR, requiring in average about 24% less product to achieve the same level of performance.

Figure 6:
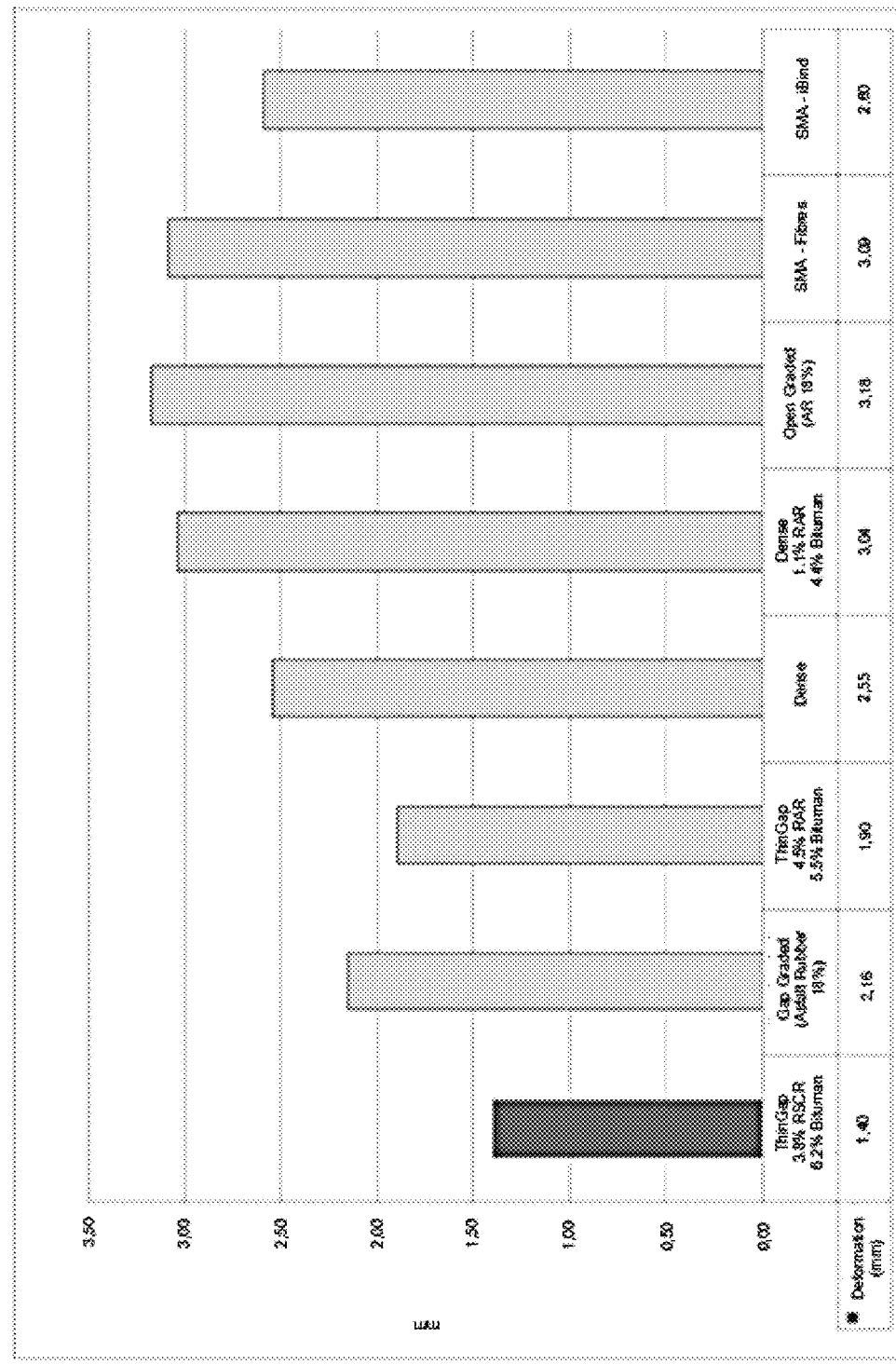
FIG. 6 shows rutting performance of mixes with RSCR and other known formulations.

The effect of RSCR in the mixes is also significantly different, especially when it is added in low amounts to the paving composition, for example about 4 wt %, turning the RSCR/bitumen combination far more elastic then mixtures known in the art. Wheel tracking tests executed as per Standard NLT 173/00 (Spanish Norm) show comparatively the effect of those very elastic binders. FIG. 6 shows the most reduced value obtained in a mixture with 3.8% RSCR by weight of the mixture (bitumen content was 6.2%). It is clearly the lowest value as compared with tradition Asphalt Rubber gap graded mixtures (with and without RAR) or even compared with traditional SMA mixtures with highly modified bitumen and fibres.

The invention claimed is:

1. A process for obtaining a rubber composite in particulate form, the process comprising the steps of:
   (a) mixing heavy-fraction oil distillate with particulate rubber at a first elevated temperature under conditions of high sheer rate to obtain oil-swollen rubber particles;
   (b) adding at least one first powdered additive to the oil-swollen rubber particles to obtain a mixture;
   (c) reducing the temperature of the first mixture by at least 20° C.;
   (d) heating the first mixture to a second elevated temperature under conditions of high sheer rate;
   (e) reducing the temperature of the mixture to about 20° C. at a cooling rate of at least 2° C./min; and
   (f) adding at least one second powdered additive to said mixture under conditions of high sheer rate to said rubber composite,
   such that the rubber composite comprises between about 10 and about 20% wt of said heavy-fraction oil distillate, the heavy-fraction oil distillate and said at least one first additive being substantially contained within an internal structure of the rubber, and the rubber's external surface being substantially oil-dry and said at least one second additive is present at the external surface of the rubber composite.

2. The process of claim 1, wherein the at least one first additive is present in the rubber composite at a content of between about 10 and about 30 wt %.

3. The process of claim 1, wherein the at least one second additive is present in the rubber composite at a content of between about 5 and about 10 wt %.

4. The process of claim 1, wherein said first elevated temperature is between about 100 and 170° C.

5. The process of claim 1, wherein said second elevated temperature is between about 130 and 180° C.

6. The process of claim 1, wherein the mixture is maintained at said second elevated temperature of a period of time of between about 1 and 60 minutes.

7. The process of claim 1, wherein said high sheer rate is obtained by mixing at at least 1200 rpm.

8. The process of claim 1, wherein said first and second additives are mineral-based powders, each being independently selected from the group consisting of limestone, hydrated lime, cement, silica, and mica.

* * * * *